(12) United States Patent
Hsu et al.

(10) Patent No.: US 12,674,633 B2
(45) Date of Patent: Jul. 7, 2026

(54) FLOATING JOINT AND RETAINER CONNECTION STRUCTURE

(71) Applicant: Shenzhen Fositek Telecom Co., Ltd., Shenzhen City (CN)

(72) Inventors: An-Szu Hsu, Shenzhen City (CN); Chun-Han Lin, Shenzhen City (CN); Yung-Chih Tseng, Shenzhen City (CN)

(73) Assignee: Shenzhen Fositek Telecom Co., Ltd., Shenzhen City (CN)

( * ) Notice: Subject to any disclaimer, the term of this patent is extended or adjusted under 35 U.S.C. 154(b) by 0 days.

(21) Appl. No.: 18/762,091

(22) Filed: Jul. 2, 2024

(65) Prior Publication Data

US 2026/0009603 A1     Jan. 8, 2026

(30) Foreign Application Priority Data

Jun. 19, 2024     (TW) .................................. 113122733

(51) Int. Cl.
  *F16L 37/08*         (2006.01)
  *F28F 9/02*          (2006.01)
(52) U.S. Cl.
  CPC ............ *F28F 9/0258* (2013.01); *F16L 37/08* (2013.01)
(58) Field of Classification Search
  CPC . F16L 37/34; F16L 37/08; F16L 21/00; F16L 27/00; F16L 39/00; F16L 39/04; F16L 39/06; F16L 41/005; F16L 41/001; F16L 41/088; F16L 41/12; F16L 41/14; F16L 47/28; F16L 47/30; F28F 9/0258
  See application file for complete search history.

(56) References Cited

U.S. PATENT DOCUMENTS 11,788,661 B2 * 10/2023 Hsieh ...................... F16L 37/42
                                                   285/316
2009/0322072 A1 * 12/2009 Tiberghien .............. F16L 37/56
                                                   285/24
2014/0127941 A1    5/2014 Lu

FOREIGN PATENT DOCUMENTS

CN        107300077 A    10/2017
TW          1540280 B     7/2016

OTHER PUBLICATIONS

Search Report dated Dec. 19, 2024 issued by Taiwan Intellectual Property Office for counterpart application No. 113122733.

* cited by examiner

*Primary Examiner* — Aaron M Dunwoody
(74) *Attorney, Agent, or Firm* — Demian K. Jackson; Jackson IPG PLLC

(57)     ABSTRACT

A floating joint and retainer connection structure includes a hollow fixed retainer having a first side and a second side provided with a through hole; an adaptor joint including a hollow guiding section having a beveled guiding surface formed along a rim of a free end thereof, and a pipe connecting section including an engaging end and a pipe fitting end extending through the fixed retainer to project from the through hole on the second side thereof; and a retaining element fitted on around an outer surface of the pipe connecting section, such that the adaptor joint is limited from moving axially but is movable radially relative to the fixed retainer. When two non-coaxial couplers are to be connected end to end, the beveled guiding surface is helpful to correct the radial offset between the two couplers, allowing them to be connected without causing wear and water leakage.

6 Claims, 7 Drawing Sheets

FLOATING JOINT AND RETAINER CONNECTION STRUCTURE

This application claims the priority benefit of Taiwan patent application number 113122733 filed on Jun. 19, 2024, the disclosure of which is hereby incorporated by reference in its entirety.

FIELD OF THE INVENTION

The present invention relates to a floating joint and retainer connection structure, and more particularly, to a floating joint and retainer connection structure that enables correction of radial offset between two couplers before the couplers are connected end to end, so that the couplers would not friction with each other to cause serious wear when they are connected.

BACKGROUND OF THE INVENTION

The present servers have largely upgraded computing performance. However, the heat produced by the computing units in the servers during operation also increases. Each server cabinet has a plurality of servers mounted therein, and the space or distance between any two adjacent servers is so narrow that it is impossible to provide thermal modules in the server cabinet in one to one correspondence with the servers. Presently, water cooling is employed to dissipate the heat produced by the servers in the sever cabinet. To protect the precision electronic parts in the servers, the pipes in the water cooling system must be leak-proof at each and all joints of the pipes to avoid damage to the electronic elements due to water leakage. To avoid water leakage, the cold water pipes of water cooling system for the servers are generally made of rigid or metal material. And, a male and a female quick coupler are correspondingly provided on the server (a movable side) and the server cabinet (a fixed side), so that waterways at the movable side and the fixed side can be quickly connected or disconnected. When connecting the male and the female coupler, there would usually be a small radial tolerance. For the purpose of quickly correcting the radial tolerance in assembling the male and the female coupler, at least one guide post is provided to one side of the female coupler at a location in the vicinity of the fixed side (i.e. the server cabinet), and a guiding seat internally provided with a guide bore is provided to one side of the male coupler at a location in vicinity of the movable side (i.e. the server) corresponding to the guide post. To assemble the male and the female coupler, first insert the guide post into the guide bore of the guide seat, then, use the guide post and the guide seat to guide the quick couplers with radial tolerance to a position for them to be very close to a coaxial state, and then serially connect the male and the female coupler end to end.

Since the space in the server cabinet is relatively narrow, the provision of the guide posts and guide seats in the server cabinet at positions to correct the radial offset between the male and female couplers would occupy additional large room in the server cabinet.

To save the space in the server cabinet, some manufacturers try to omit the guide posts and the guide seats. For this purpose, it is necessary to highly precisely control the tolerance of the radial offset between the male and the female coupler to be connected end to end, and to provide a beveled surface on an inner hole of the female coupler at a position that will get contact with the male coupler first. When the male coupler contacts with the beveled surface and is guided into the female coupler, the two couplers are in frictional contact with each other to correct a minor amount of radial offset between them to enable smooth connection of the two couplers. In the above described way, while the guide posts and the guide seats are omitted, other problems occur. That is, the requirement for high-precision fit increases the time and labor for assembling and results in increased manufacturing cost. Further, when the correction of radial offset is directly performed on the male and female couplers, a front end of the male coupler is subjected to collision with the female coupler to cause wear and damage, which will lead to insufficient water-tightness between junctures between the male and female couplers and between various sealing elements and failure in shutting off the water valves provided between the male and female couplers. In this situation, leakage would occur due poor seal between the male and the female coupler. Therefore, it is an important goal for those skilled in the art to overcome the disadvantages in the prior art.

SUMMARY OF THE INVENTION

To effectively solve the above problems, a primary object of the present invention is to provide a floating joint and retainer connection structure capable of correcting radial offset, such that a radial offset between two quick couplers having assembling tolerance can be successfully corrected using the floating joint and retainer connection structure, allowing the two couplers to be connected end to end.

To achieve the above and other objects, the floating joint and retainer connection structure according to the present invention includes a fixed retainer, an adaptor joint, and a retaining element.

The fixed retainer has a first side and a second side and internally defines a first receiving space between the first and the second side; the first side is in an open state while the second side is closed but having a through hole provided thereat, and the through hole is communicable with the first receiving space. The adaptor joint has a guiding section and a pipe connecting section. The guiding section internally defines a second receiving space and has an open free end with a beveled guiding surface formed along a rim of the free end. The pipe connecting section includes a pipe fitting end and an engaging end, and internally defines a flow passage communicable with the second receiving space. The pipe connecting section of the adaptor joint is extended through the first receiving space to project from the through hole of the fixed retainer. The retaining element is fitted on around an outer surface of the pipe connecting section of the adaptor joint to limit the adaptor joint from moving axially relative to the fixed retainer while allows the adaptor joint to move radially relative to the fixed retainer.

A male coupler is disposed in the second receiving space of the adaptor joint with an end of the male coupler connected to the engaging end of the pipe connecting section. When the male coupler is to be axially connected to a female coupler end to end, the beveled guiding surface on the guiding section of the adaptor joint gets in contact with the female coupler first and then guides the female coupler into the second receiving space in the adaptor joint. At this point, the adaptor joint is brought to move radially. When the female coupler is completely guided into the second receiving space, the male and the female coupler almost have the same centerline to be coaxial with each other and accordingly, can be connected axially.

With the present invention, the radial offset between the male and the female coupler can be corrected without the need of providing additional guide posts and guiding seats, and the male and the female coupler can be axially connected end to end.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
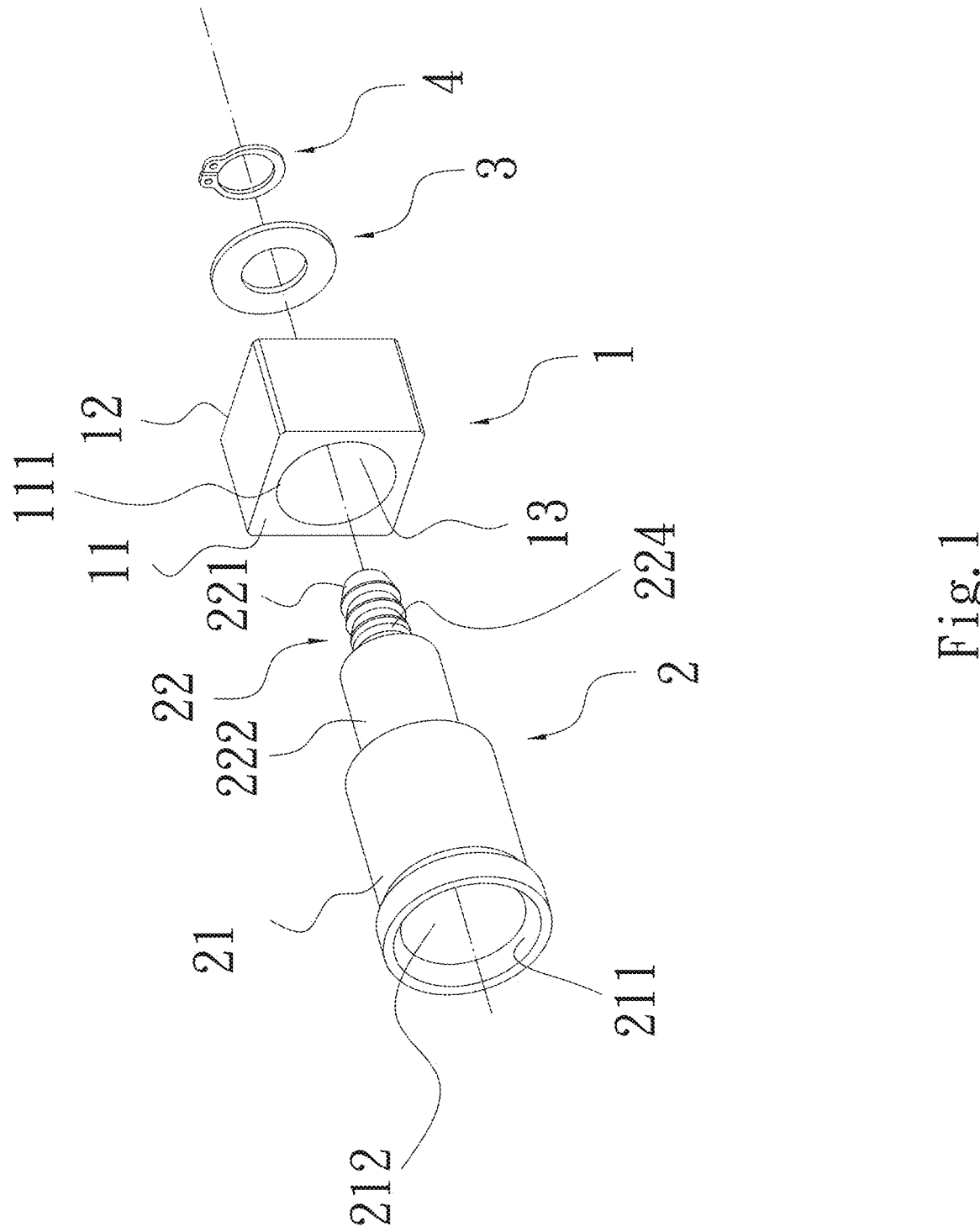
FIG. 1 is an exploded perspective view of a floating joint and retainer connection structure according to a first embodiment of the present invention.

The present invention will now be described with some preferred embodiments thereof. For the purpose of easy to understand, elements that are the same in the preferred embodiments are denoted by the same reference numerals.

Figure 2:
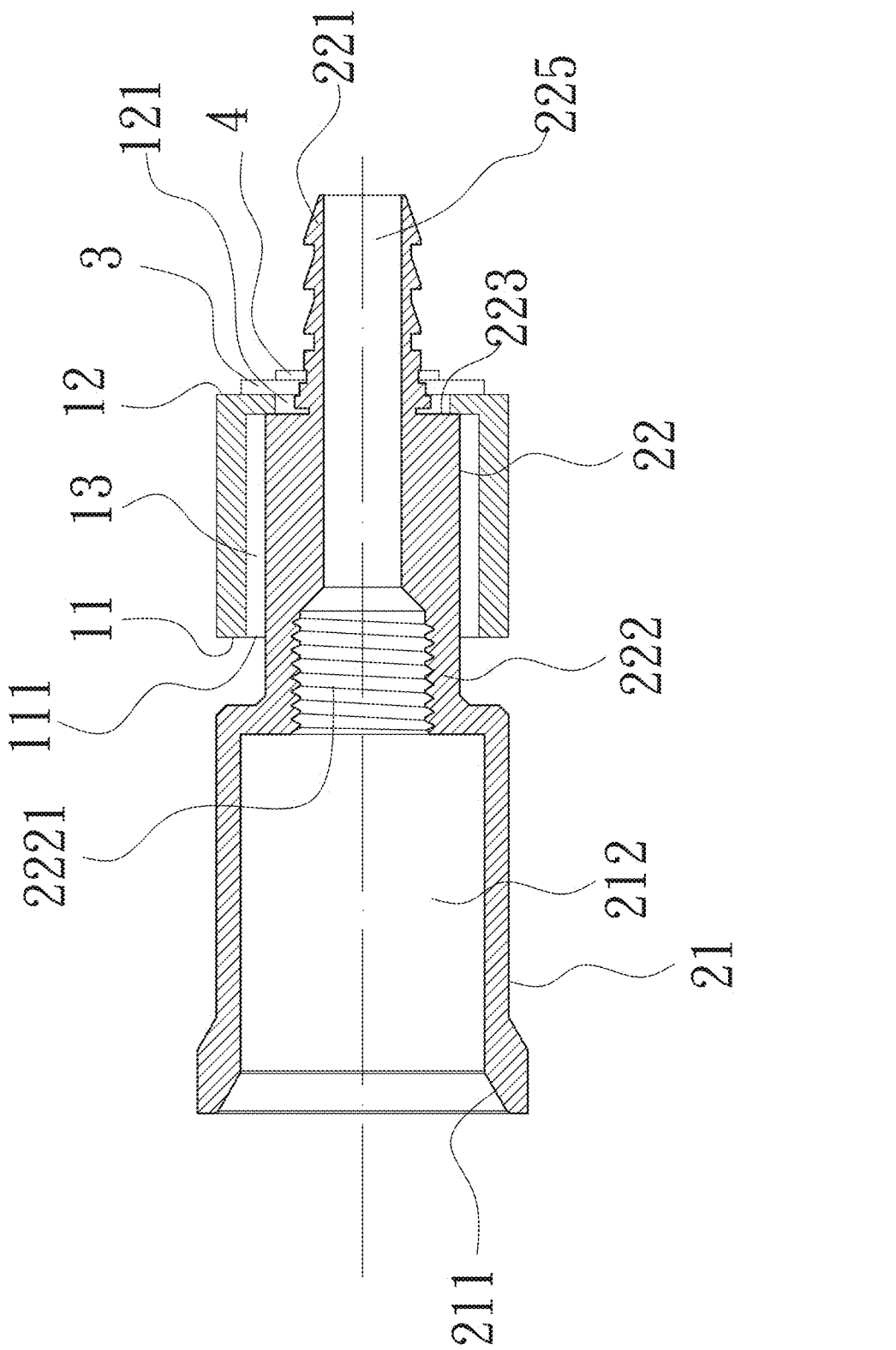
FIG. 2 is an assembled sectional view of FIG. 1.

Please refer to FIGS. 1 and 2, which are exploded perspective view and assembled sectional view, respectively, of a floating joint and retainer connection structure according to a first embodiment of the present invention. As shown, the floating joint and retainer connection structure includes a fixed retainer 1, an adaptor joint 2, a first washer 3, and a retaining element 4.

The fixed retainer 1 has a first side 11 and a second side 12 located opposite to each other, and internally defines a first receiving space 13 located between the first and the second side 11, 12. The first side 11 of the fixed retainer 1 is provided with a penetrating opening 111, so that the first side 11 is in an open state. The penetrating opening 111 communicates with the first receiving space 13. The second side 12 of the fixed retainer 1 is a closed side provided with a through hole 121, which also communicates with the first receiving space 13.

The adaptor joint 2 includes a guiding section 21 and a pipe connecting section 22. The guiding section 21 has a free end being an open end provided along a rim thereof with a beveled guiding surface 211, and internally defines a second receiving space 212. The guiding section 21 and the pipe connecting section 22 can be integrally formed or separately formed. In the illustrated first embodiment, the guiding section 21 and the pipe connecting section 22 are integrally formed with the pipe connecting section 22 extending from another end of the guiding section 21. However, it is understood the guiding section 21 and the pipe connecting section 22 are not necessarily integrally formed.

The pipe connecting section 22 has two opposite ends, namely, a pipe fitting end 221 and an engaging end 222 integrally connected to the guiding section 21. The pipe connecting section 22 internally defines a flow passage 225, which communicates with the second receiving space 212. The pipe connecting section 22 of the adaptor joint 2 is extended through the first receiving space 13 and projected from the through hole 121. The engaging end 222 of the pipe connecting section 22 has an abutting surface 223 abutted against an inner surface of the second side 12 of the fixed retainer 1. The pipe fitting end 221 of the pipe connecting section 22 enables the adaptor joint 2 to connect to an external pipe. The pipe (not shown) is directly fitted on around the outer side of the pipe fitting end 221 to thereby connect to the adaptor joint 2. The through hole 121 on the fixed retainer 1 has an inner diameter larger than an outer diameter of the pipe fitting end 221 of the pipe connecting section 22 of the adaptor joint 2, such that there is a radial clearance between the adaptor joint 2 and the fixed retainer 1, allowing the adaptor joint 2 to move radially relative to the fixed retainer 1.

The second receiving space 212 of the guiding section 21 can receive a male coupler 5 therein. The male coupler 5 has an end correspondingly connected to the engaging end 222. In the illustrated first embodiment, the engaging end 222 is internally provided with female threads 2221, and the end of the male coupler 5 for connecting to the engaging end 222 is correspondingly provided on around its outer side with male threads 51. The male coupler 5 is connected to the adaptor joint 2 through engagement of the male threads 51 with the female threads 2221 in the engaging end 222.

The first washer 3 is fitted on around an outer surface of the pipe connecting section 22 of the adaptor joint 2 with one side attached to an outer surface of the second side 12 of the fixed retainer 1. The pipe connecting section 22 is externally provided with an annular groove 224, and the retaining element 4 is fitted on around the outer surface of the pipe connecting section 22 of the adaptor joint 2 to hold the pipe connecting section 22 to the fixed retainer 1. The retaining element 4 can be a nut, a retaining ring, or other elements with locking function. In the first embodiment, the retaining element 4 is non-restrictively illustrated as a retaining ring. The retaining element 4 is set in the annular groove 224 to attach to another side of the first washer 3, such that the retaining element 4 and the first washer 3 together limit the adaptor joint 2 from moving axially relative to the fixed retainer 1 while the adaptor joint 2 is radially movable relative to the fixed retainer 1.

Figure 3A:
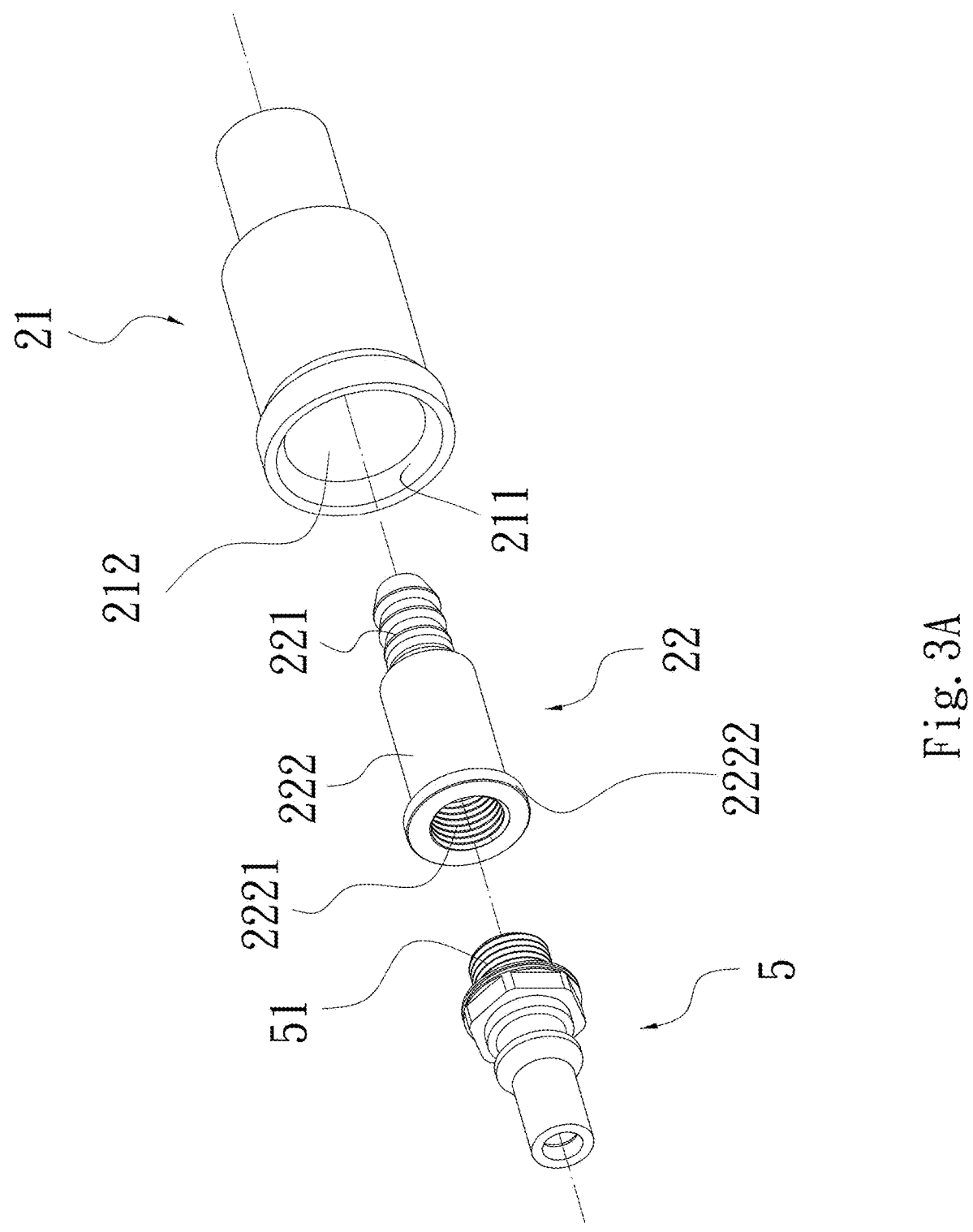
FIG. 3A is an exploded perspective view of a floating joint and retainer connection structure according to a second embodiment of the present invention, illustrating the components in one directional view without showing the fixed retainer.
Figure 3B:
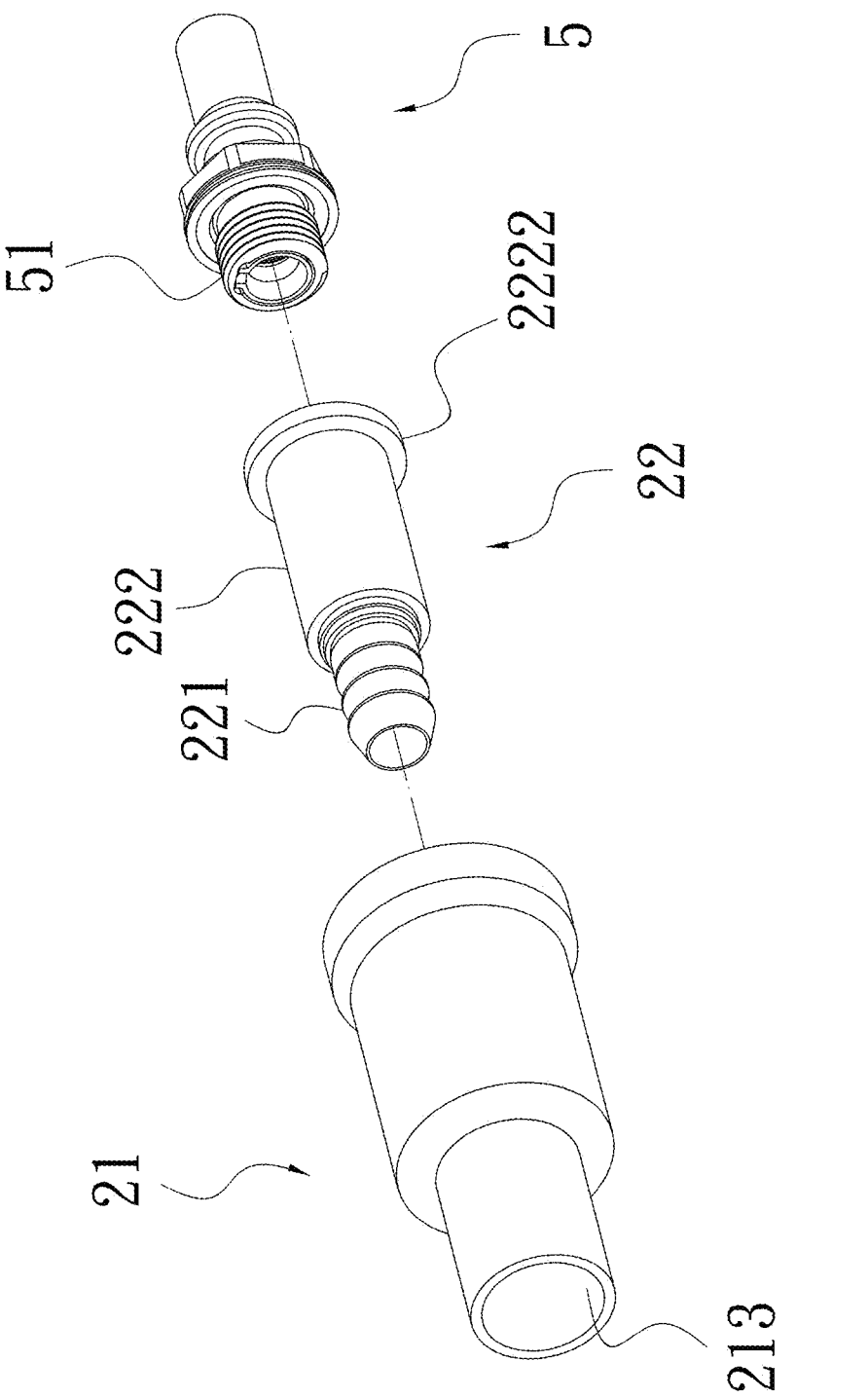
FIG. 3B is an exploded perspective view of the floating joint and retainer connection structure of FIG. 3A, illustrating the components from an opposite directional view without showing the fixed retainer.
Figure 4:
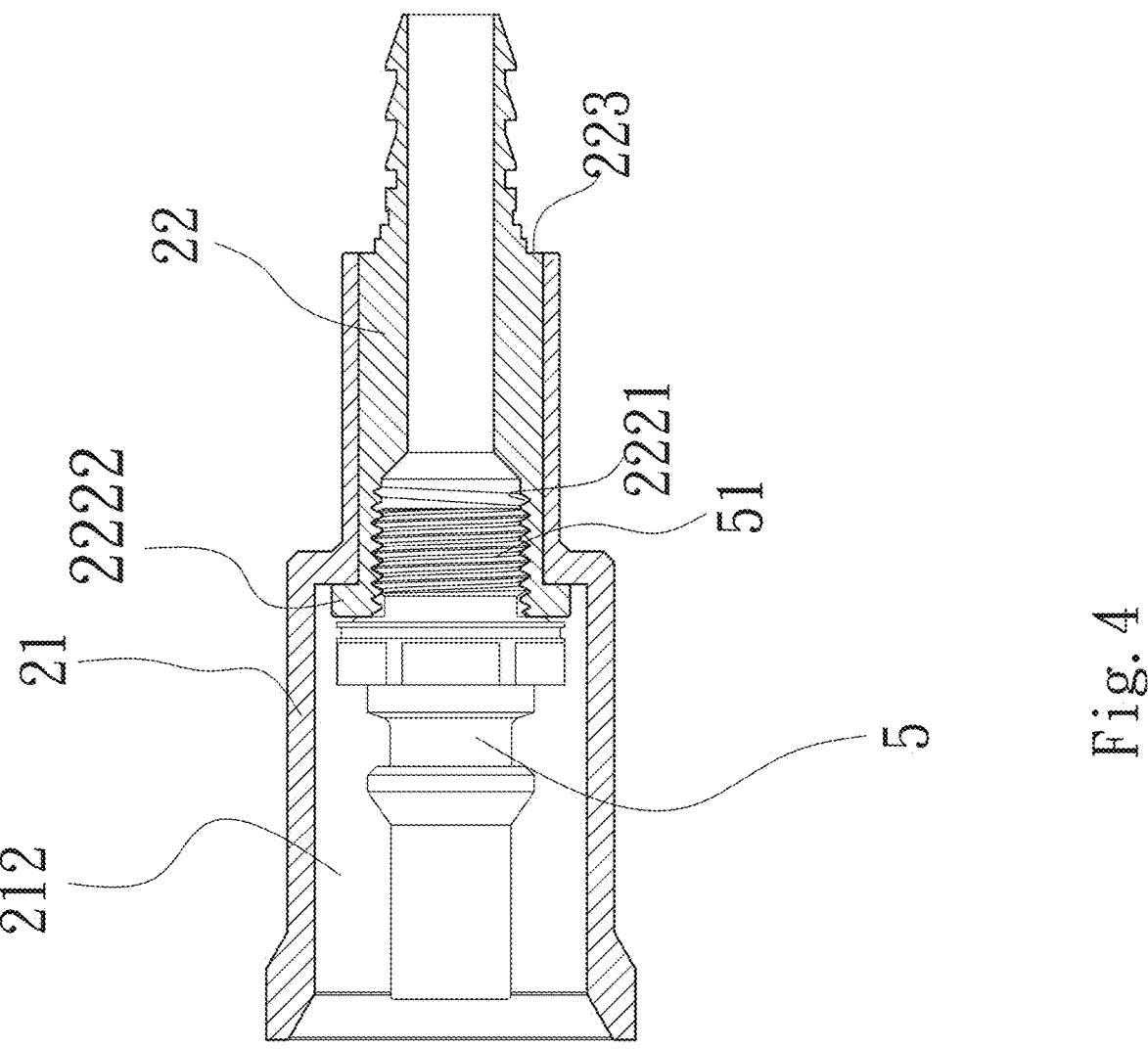
FIG. 4 is an assembled sectional view of FIG. 3A.
Figure 5:
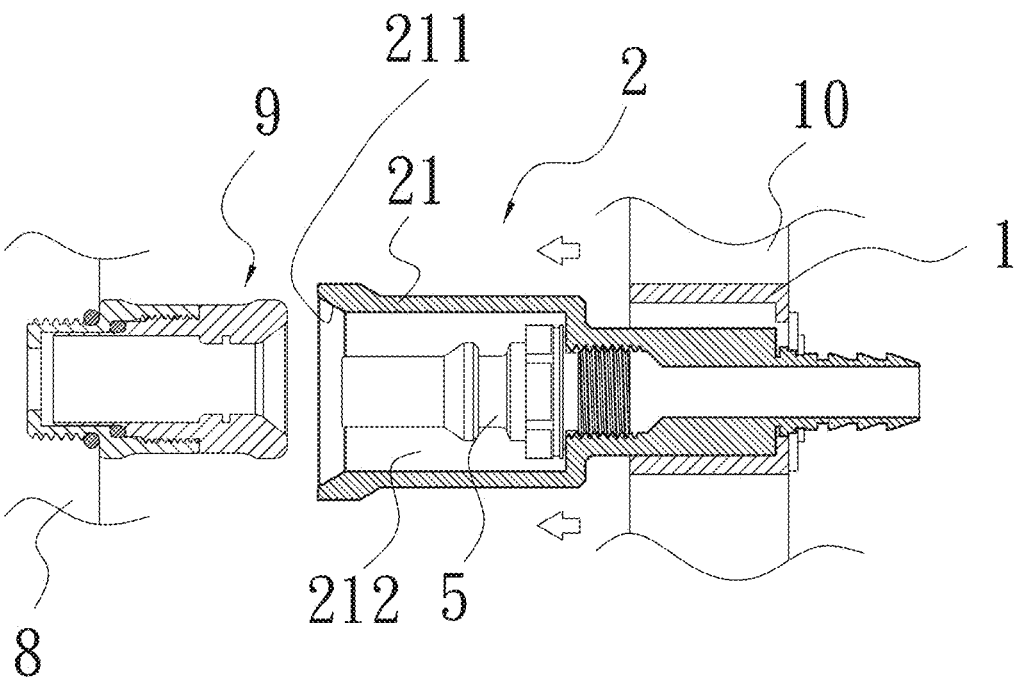
FIGS. 5 to 8 show the use of the floating joint and retainer connection structure of the present invention to correct a radial offset between two couplers.
Figure 6:
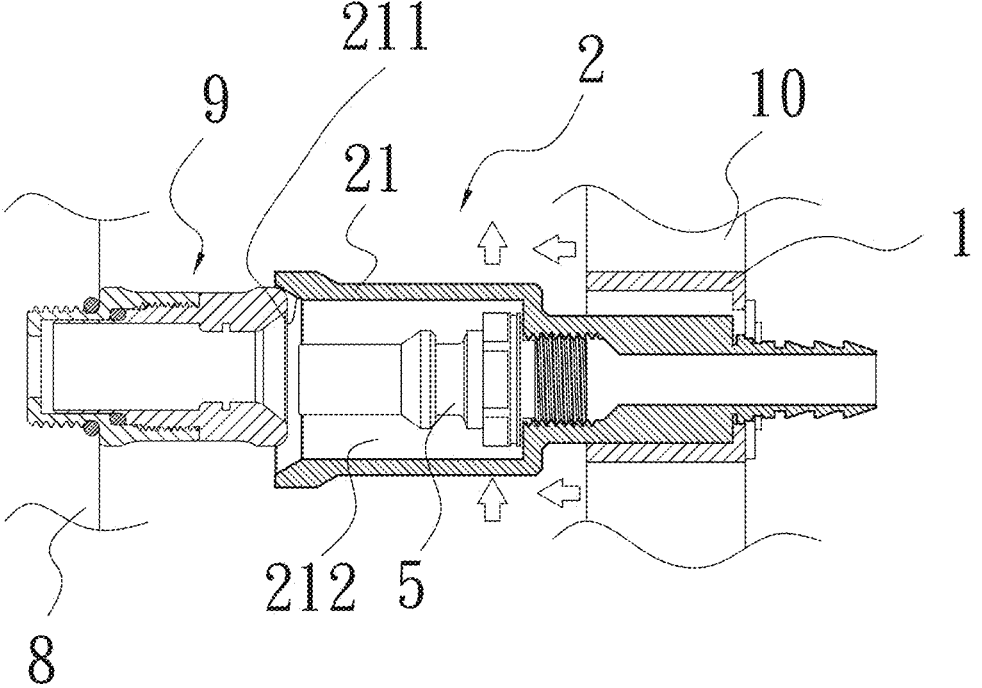
Figure 7:
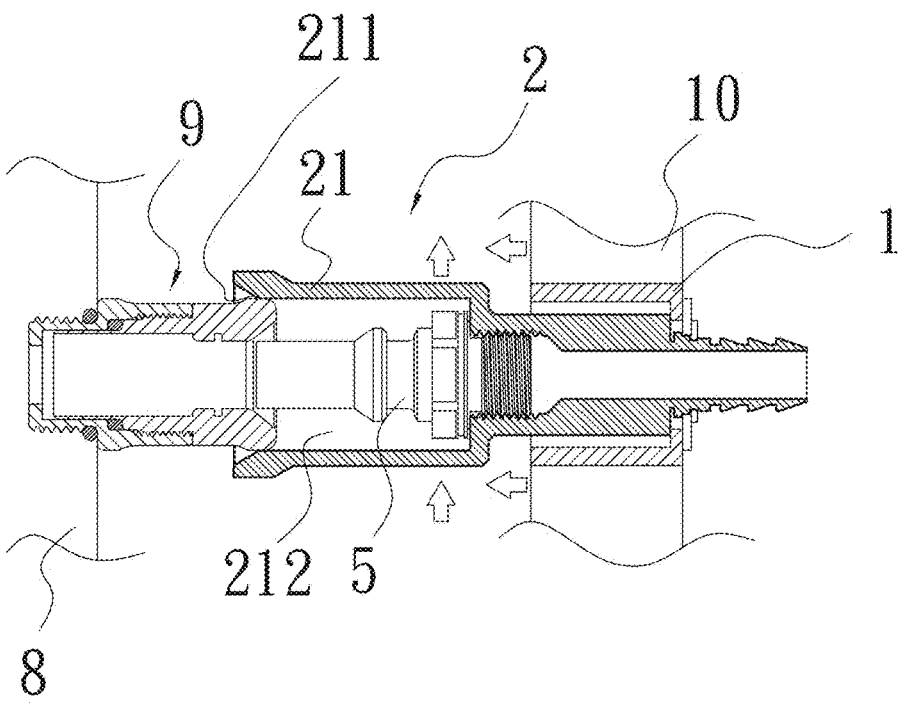
Figure 8:
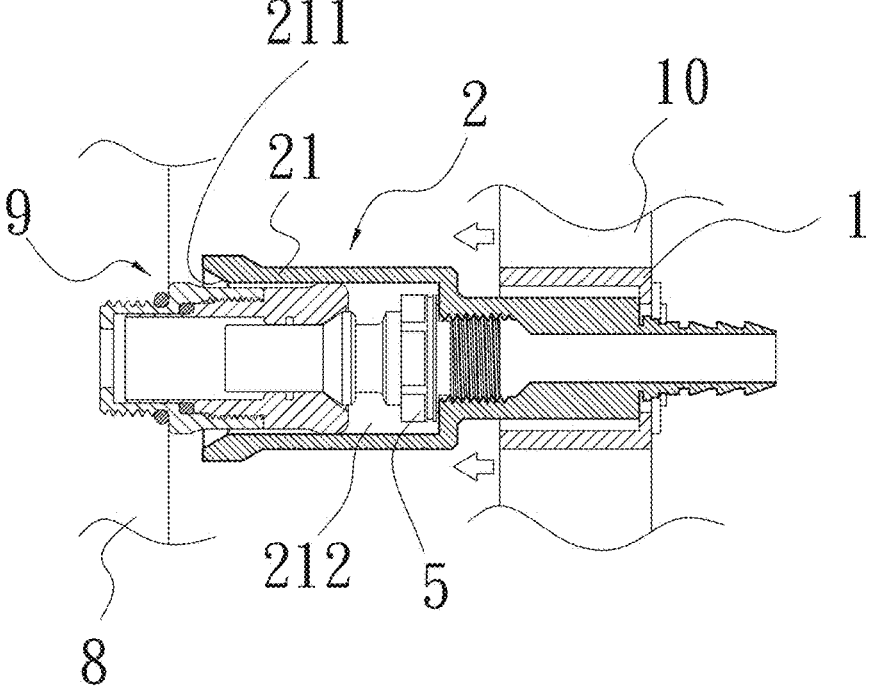

Please refer to FIGS. 3A, 3B, and 4. FIG. 3A is an exploded perspective view showing the adaptor joint of the floating joint and retainer connection structure according to a second embodiment of the present invention, viewed from one side. FIG. 3B is an exploded perspective view of the adaptor joint viewed from the opposite side (rotated 180 degrees relative to FIG. 3A). FIG. 4 is an assembled sectional view of the floating joint and retainer connection structure according to the second embodiment. As shown, in the second embodiment, the guiding section 21 and the pipe connecting section 22 of the adaptor joint 2 are not integrally formed, they are two separate elements assembled to each other. An end of the guiding section 21 opposite to the free end having the beveled guiding surface 211 is formed into a communicating bore 213. The engaging end 222 of the pipe connecting section 22 is provided with a flange 2222, which has an outer diameter larger than an inner diameter of the communicating bore 213. When the pipe connecting section 22 is inserted into the communicating bore 213, the flange 2222 is stopped by the communicating bore 213 and limited from moving axially any further relative to the guiding section 21 of the adaptor joint 2.

The male coupler 5 enters the guiding section 21 via the second receiving space 212 of the guiding section 21 to connect to the pipe connecting section 22 through engagement of the male threads 51 provided on the male coupler 5 with the female threads 2221 provided in the pipe connecting section 22.

The pipe fitting end 221 and the engaging end 222 of the adaptor joint 2 further has a buffer section provided between them. The buffer section has a spring and a second washer fitted on around an outer surface thereof. The spring has two opposite ends elastically pressing against an inner surface of the second side 12 of the fixed retainer 1 and one side surface of the second washer.

The buffer section serves to provide an axial extension allowance of the adaptor joint 2 relative to the fixed retainer 1. The spring provides an axial normal force and frictional force to ensure that the adaptor joint 2 is radially movable relative to the fixed retainer 1 more smoothly. The second washer enables the adaptor joint 2 to move axially relative to the fixed retainer 1 smoothly.

Please refer to FIGS. 5 to 8, which show the use of the floating joint and retainer connection structure according to the present invention to connect two non-coaxial couplers. It is noted, when viewing in front of the drawings, the left side of FIGS. 5 to 8 is a fixed side, which is illustrated as a server cabinet 8 in the present invention. A female coupler 9 is mounted on the fixed side, i.e. on the server cabinet 8. There are also other parts on the server cabinet 8 but they are not described in detail herein. As to components shown in the right or movable side of FIGS. 5 to 8, they are movable relative to the server cabinet 8. In FIGS. 5 to 8, the movable side is illustrated as a server case or server chassis 10 assembled to the server cabinet 8 in slip fit. The floating joint and retainer connection structure of the present invention is mounted on the movable side server case 10. The following description is related to the movements of the parts included in the present invention. As to other parts on the server case 10, they are not particularly described herein. As shown, the fixed retainer 1 of the floating joint and retainer connection structure of the present invention is mounted on the server case 10. When it is desired to axially connect the server case 10 to the server cabinet 8 end to end via the male coupler 5 and the female coupler 9 while the server cabinet 8 and the server case 10 are not coaxial with each other, i.e. the male coupler 5 and the female coupler 9 are radially offset from each other, the floating joint and retainer connection structure of the present invention can be used to correct the radial offset between the male and the female coupler 5, 9 as much as possible to an acceptable error before they can be connected end to end.

To use the floating joint and retainer connection structure of the present invention, first correct the radial offset between the guiding section 21 of the adaptor joint 2 and the female coupler 9 by contacting a rim of a free end of the female coupler 9 with the beveled guiding surface 211 of the guiding section 21. When the adaptor joint 2 keeps moving axially toward the female coupler 9, the beveled guiding surface 211 helps the adaptor joint 2 to move radially. When the female coupler 9 is completely moved into the second receiving space 212, the radial offset between the female coupler 9 and the male coupler 5 in the second receiving space 212 is almost corrected to be zero, allowing the male coupler 5 to insert into the female coupler 9 to complete the connection of the server case 10 to the server cabinet 8.

The present invention is characterized by that the correction of the radial offset between the male coupler 5 and the female coupler 9 is performed using the adaptor joint 2, instead of contacting the male coupler 5 with the female coupler 9 directly. With this arrangement, it is able to avoid the male and the female coupler 5, 9 from wear that would otherwise occur if the male and the female coupler 5, 9 are forced to connect to each other directly and frictionally. Accordingly, the junctures and the tightness between the connected male and female couplers 5, 9 can maintain integral to ensure the water valves provided in the male and female couplers 5, 9 are fully sealed without the risk of leakage.

Further, the magnitude of the radial offset that can be corrected between the male and the female coupler 5, 9 is adjustable by changing the design proportion of the beveled guiding surface 211 of the guiding section 21 on the adaptor joint 2 and the range within which the adaptor joint 2 is radially movable relative to the fixed retainer 1.

With the present invention, the guiding posts and guiding seats used in the prior art to correct the radial offset can be omitted to save a large amount of costs for setting the guiding posts and seats and to overcome the problem of narrow transition space between the server cabinet and the server case.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A floating joint and retainer connection structure comprising:
   a fixed retainer having a first side and a second side and internally defining a first receiving space between the first and the second side; the first side being in an open state while the second side having a through hole provided thereat; and the through hole being communicable with the first receiving space;
   an adaptor joint having a guiding section and a pipe connecting section; the guiding section internally defining a second receiving space and having a free end in an open state with a beveled guiding surface formed along a rim of the free end; the pipe connecting section including a pipe fitting end and an engaging end, and internally defining a flow passage communicable with the second receiving space; and the pipe connecting section of the adaptor joint being extended through the first receiving space to project from the through hole of the fixed retainer;
   a retaining element fitted on around an outer surface of the pipe connecting section of the adaptor joint to limit the adaptor joint from moving axially relative to the fixed retainer while allowing the adaptor joint to move radially relative to the fixed retainer; and
   a first washer fitted on around the outer surface of the pipe connecting section of the adaptor joint with one side of the first washer attached to an outer surface of the second side of the fixed retainer.

2. The floating joint and retainer connection structure as claimed in claim 1, further comprising a male coupler disposed in the second receiving space of the adaptor joint with an end of the male coupler connected to the engaging end of the pipe connecting section; the engaging end of the pipe connecting section being internally provided with female threads, and the male coupler being externally provided on an end for correspondingly connecting to the engaging end with male threads; and the male coupler being connected to the engaging end through meshing of the male threads with the female threads.

3. The floating joint and retainer connection structure as claimed in claim 1, wherein the retaining element is a retaining ring.

4. The floating joint and retainer connection structure as claimed in claim 1, wherein the through hole on the fixed retainer has an inner diameter larger than an outer diameter of the pipe fitting end of the pipe connecting section.

5. The floating joint and retainer connection structure as claimed in claim 1, wherein the first side of the fixed retainer is provided with a penetrating opening, which is communicable with the first receiving space.

6. The floating joint and retainer connection structure as claimed in claim 1, wherein the engaging end of the pipe connecting section of the adaptor joint has an abutting surface abutting against an inner surface of the second side of the fixed retainer.

\* \* \* \* \*